(12) United States Patent
Dropps et al.

(10) Patent No.: US 9,172,655 B1
(45) Date of Patent: Oct. 27, 2015

(54) SYSTEMS AND METHODS FOR QUALITY OF SERVICE IN NETWORKS

(71) Applicant: QLOGIC, Corporation, Aliso Viejo, CA (US)

(72) Inventors: Frank R. Dropps, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 148 days.

(21) Appl. No.: 13/678,135

(22) Filed: Nov. 15, 2012

(51) Int. Cl.
*H04L 12/863* (2013.01)

(52) U.S. Cl.
CPC .................................. *H04L 47/6215* (2013.01)

(58) Field of Classification Search
CPC ........ H04L 69/08; H04L 47/52; H04L 49/205
USPC .............................................. 370/395.21, 236
See application file for complete search history.

(56) References Cited

U.S. PATENT DOCUMENTS

| | | | |
|---|---|---|---|
| 6,184,906 B1 * | 2/2001 | Wang et al. .................... | 345/532 |
| 6,697,369 B1 * | 2/2004 | Dziong et al. ............. | 370/395.2 |
| 6,791,941 B1 * | 9/2004 | Dziong et al. ................ | 370/229 |
| 6,859,454 B1 * | 2/2005 | Bowes .......................... | 370/366 |
| 7,193,994 B1 * | 3/2007 | Payson .......................... | 370/380 |
| 7,236,488 B1 * | 6/2007 | Kavipurapu ................... | 370/388 |
| 7,668,177 B1 * | 2/2010 | Trapp et al. .............. | 370/395.42 |
| 7,697,519 B2 * | 4/2010 | Arndt ............................ | 370/389 |
| 8,542,580 B2 * | 9/2013 | Li .................................. | 370/230 |
| 2002/0181484 A1 * | 12/2002 | Aimoto ......................... | 370/413 |
| 2003/0002505 A1 * | 1/2003 | Hoch et al. .................... | 370/392 |
| 2005/0190794 A1 * | 9/2005 | Krause et al. ................. | 370/485 |
| 2006/0153179 A1 * | 7/2006 | Ho et al. ........................ | 370/386 |
| 2007/0268931 A1 * | 11/2007 | Shaikli .......................... | 370/468 |
| 2010/0083281 A1 * | 4/2010 | Malladi et al. ................ | 719/317 |
| 2012/0278514 A1 * | 11/2012 | Gupta ............................ | 710/48 |

* cited by examiner

*Primary Examiner* — Edan Orgad
*Assistant Examiner* — Emmanuel Maglo
(74) *Attorney, Agent, or Firm* — Klein, O'Neill & Singh, LLP

(57) ABSTRACT

System and methods for providing quality of service (QOS) in networks. The method includes determining whether a transmit segment of a port of a network device has received a grant from a scheduler to transmit a packet. The port includes a plurality of sub-ports that share the transmit segment to transmit packets and a receive segment to receive packets. When the transmit buffer has received the grant, a virtual queue associated with the grant is mapped to a QOS bin that includes a minimum bandwidth limit threshold value, a maximum bandwidth threshold value, and a counter for counting actual bandwidth consumed. The QOS bin monitors bandwidth consumed by a source traffic group for adjusting QOS priority and the source traffic group includes the virtual queue.

20 Claims, 7 Drawing Sheets

SYSTEMS AND METHODS FOR QUALITY OF SERVICE IN NETWORKS

TECHNICAL FIELD

The present embodiments relate to quality of service in networks.

BACKGROUND

Mixing protocols on a same network device may need different quality of service (QOS) methods. A typical implementation emphasizes quantity of service rather than quality of service. With quality of service requested bandwidth is guaranteed. By contrast, with quantity of service an attempt is made to provide requested bandwidth, but it is not guaranteed. Continuous efforts are being made to provide QOS in networks.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine-implemented method for providing quality of service (QOS) in a network is provided. The method includes determining whether a transmit segment of a port of a network device has received a grant from a scheduler to transmit a packet; wherein the port includes a plurality of sub-ports that share the transmit segment to transmit packets and share a receive segment to receive packets. When the transmit buffer has received the grant, a virtual queue associated with the grant is mapped to a QOS bin that includes a minimum bandwidth threshold value, a maximum bandwidth threshold value, and a counter for counting actual bandwidth consumed. The QOS bin monitors bandwidth consumed by a source traffic group for adjusting QOS priority and the source traffic group includes the virtual queue.

The method further includes comparing a counter value with the minimum bandwidth threshold value and the maximum bandwidth threshold value after the packet is transmitted; adjusting a QOS priority for the QOS bin, based on the comparison, when the counter value has reached the maximum bandwidth threshold value or the minimum bandwidth threshold value; and sending an adjusted QOS priority to the scheduler when the QOS priority is adjusted such that the scheduler can use the adjusted priority when evaluating requests from the plurality of sub-ports for processing received packets.

In another embodiment, a network device is provided. The network device includes a plurality of base-ports, each base-port having a plurality of sub-ports configured to operate independently as a port for sending and receiving packets using a shared transmit segment to transmit packets and a shared receive segment to receive packets; a scheduler that evaluates requests from the plurality of sub-ports for processing packets received at the plurality of sub-ports of each base-port; and a QOS bin module that maintains a plurality of QOS bins for monitoring bandwidth consumed by a source traffic group, each QOS bin including a minimum bandwidth threshold value, a maximum bandwidth threshold value, and a counter for counting actual bandwidth consumed by the source traffic group.

When the transmit segment receives a grant from the scheduler to transmit a packet, a virtual queue associated with the grant is mapped to one of the QOS bins and a value of the counter is incremented after the packet is transmitted and the counter value is compared with the minimum bandwidth threshold value and the maximum bandwidth threshold value. Furthermore, a QOS priority for the bin is adjusted when, based on the comparison, the counter value has reached either the maximum bandwidth threshold value or the minimum bandwidth threshold value and an adjusted QOS priority is sent to the scheduler when the QOS priority is adjusted such that the scheduler can use the adjusted priority when evaluating requests from the plurality of sub-ports for processing received packets.

In yet another embodiment, a machine-implemented method for a network is provided. The method includes determining whether a transmit segment of a port of a network device has received a grant from a scheduler to transmit a packet; wherein the port includes a plurality of sub-ports that share the transmit segment to transmit packets and a receive segment to receive packets; when the transmit buffer has received the grant, mapping a virtual queue associated with the grant to a QOS bin that includes a minimum bandwidth threshold value, a maximum bandwidth threshold value, and a counter for counting actual bandwidth consumed; wherein the QOS bin monitors bandwidth consumed by a source traffic group for adjusting QOS priority and the source traffic group includes the virtual queue; comparing a counter value with the minimum bandwidth threshold value and the maximum bandwidth threshold value after the packet is transmitted; and adjusting a QOS priority for the QOS bin, based on the comparison, when the counter value has reached the maximum bandwidth threshold value or the minimum bandwidth threshold value.

BRIEF DESCRIPTION OF THE DRAWINGS

The various present embodiments now will be discussed in detail with an emphasis on highlighting the advantageous features. These embodiments depict the novel and non-obvious systems and methods for quality of service in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
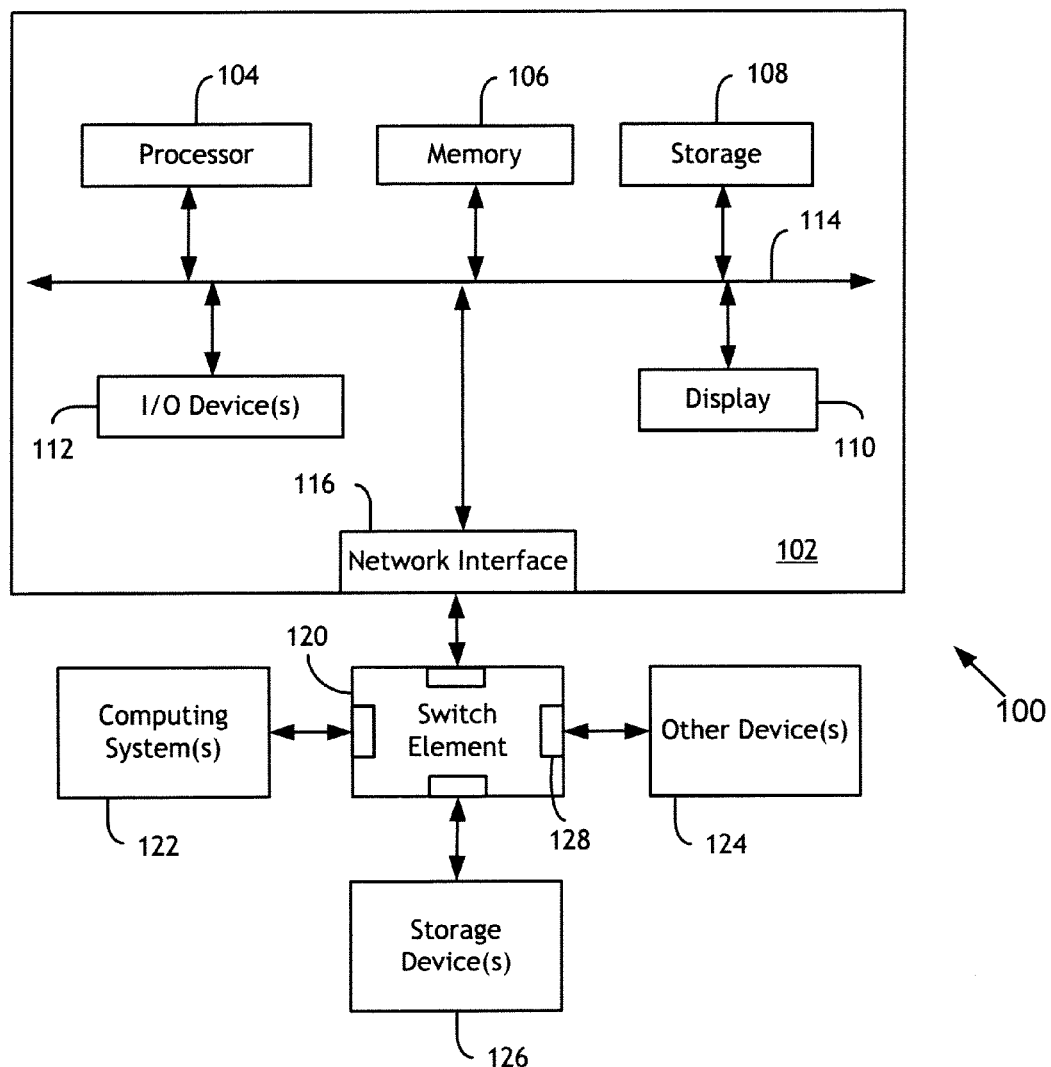

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 of host system 102 and interface (not shown) for the storage devices 126. Fabric ports are typically located in Fabric devices, such as the switch 120. Details regarding the switch 120 are provided below.

Figure 2A:
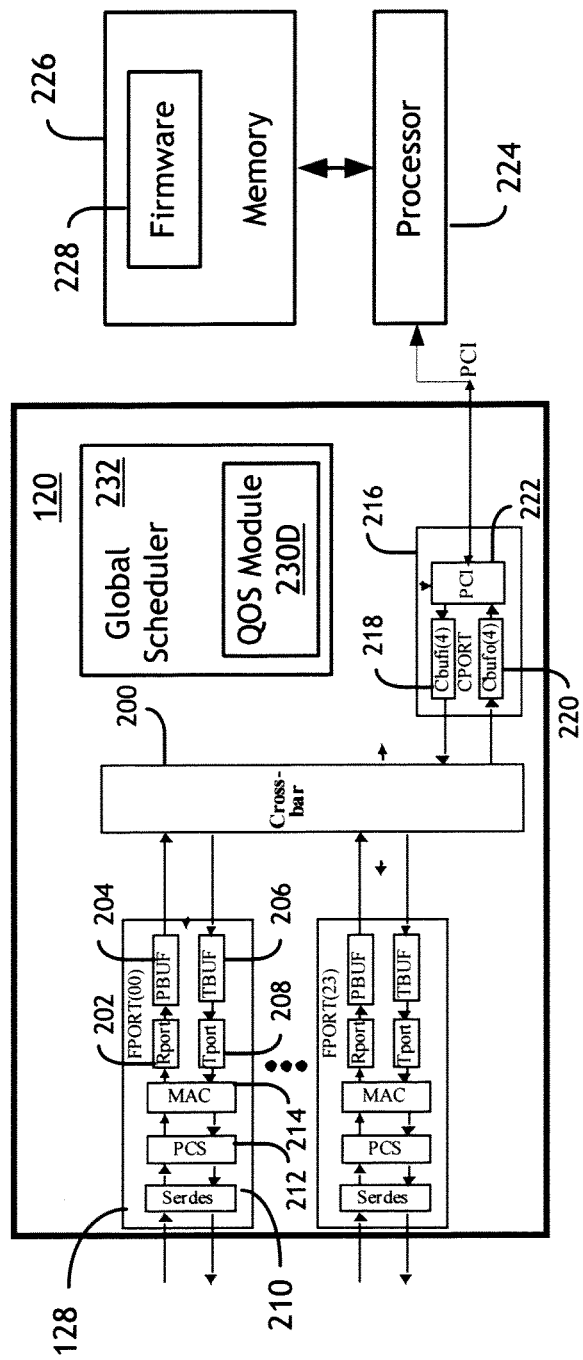
FIG. 2A is a functional block diagram of a switch element, according to the present embodiments.

FIG. 2A is a high-level block diagram of the switch 120, also referred to as the switch element 120. Switch element 120 may be implemented as an application specific integrated circuit (ASIC) having a plurality of ports 128. The ports 128 are generic (GL) and may include an N_Port, F_Port, FL_Port, E-Port, or any other port type. The ports 128 may be configured to operate as Fibre Channel, FCoE or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a switch crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared pipeline for receiving frames (or information). The pipeline includes a serializer/deserializer (SERDES) 210, a physical coding sub-layer (PCS) 212, and a media access control (MAC) sub-layer 214. The SERDES 210 receives incoming serial data and converts it to parallel data. The parallel data is then sent to the PCS 212 and the MAC 214 for processing before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT) via the crossbar 200 and a transmit buffer (TBUF) 206. The TBUF 206 is a temporary memory storage device where frames or information related to frames are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 to the processor 224.

Port 128 described above may be referred to as a "base port" that may have more than one network link available for receiving and transmitting information. Each network link allows the base port to be configured into a plurality of sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
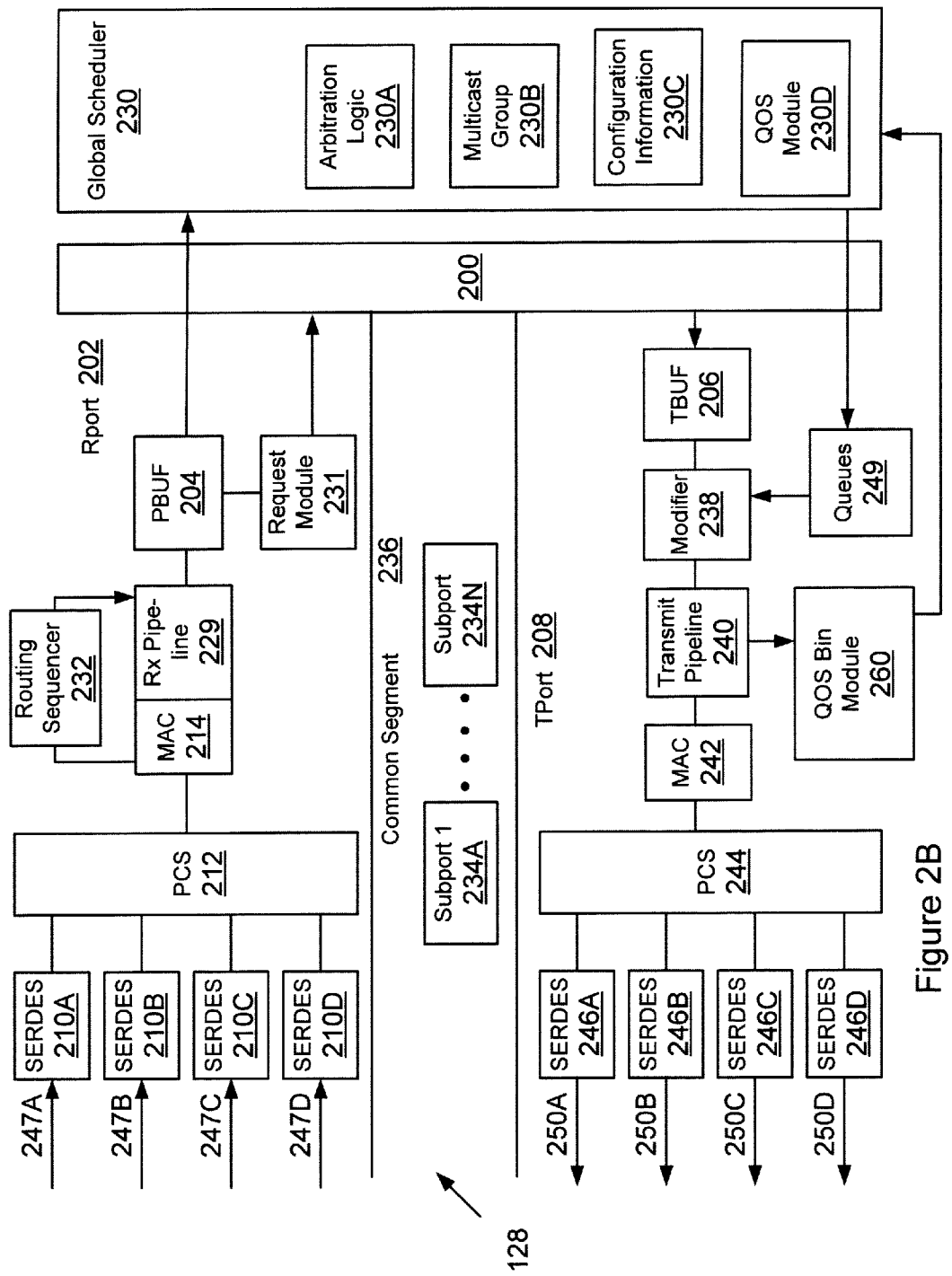
FIG. 2B is a functional block diagram of a sub-port including a plurality of physical and virtual queues, according to the present embodiments.

FIG. 2B shows an example of base port 128 having RPORT 202, TPORT 208, and a common segment 236, according to one embodiment. RPORT 202 is used for receiving and processing frames, while TPORT 208 is used for transmitting frames. Common segment 236 is used to store configuration and status information that may be commonly used among different components of base port 128.

In one embodiment, base port 128 may be configured to include a plurality of sub-ports. The configuration, status, and statistics information/logic 234A-234N for each sub-port may be stored in common segment 236. The configuration logic 234A-234N may include look up tables or other data structures for storing configuration information.

RPORT 202 may include or be coupled to a plurality of network links, for example, four independent physical network links (or lanes) 247A-247D, each configured to operate as a portion of an independent sub-port within base port 128. Each network link is coupled to a SERDES 210A-210D, all of which share PCS 212 and MAC 214. The multiple lanes also share a receive pipeline 229 that is used for pre-processing received frames before they are transferred. Both MAC 214 and receive pipelines 229 are time multiplexed (i.e. each sub-port of the base-port 128 is provided with access to the pipeline during a certain phase of a system clock) so that they can be shared among the plurality of links based on how the ports are configured to operate. In one embodiment, PCS 212 and MAC 214 may be a part of the receive pipeline 229.

Incoming frames are received via one of the network links 247A-247D. A received frame is processed by the appropriate SERDES and then sent to the PCS 212. After PCS 212 processes the frame, the frame is provided to MAC 212 that is time-shared among a plurality of sub-ports. Thus, for a certain time segment (for example, a clock cycle), MAC 214 may be used by one of the sub-ports. After the MAC 212 processes the frame it is sent to receive pipeline 229 that is also time-shared.

Information regarding the frame or a copy of the frame is also provided to a routing sequencer 232 that determines a destination for the received frame. In one embodiment, a frame whose destination is processor 224 is given the highest priority, followed by a frame that is routed by a ternary content addressable memory (TCAM) or steering registers located within the routing sequencer 232. More than one routing sequencer 232 may be used for each base port 128. Frames that are ready to be sent out are staged at PBUF 204. PBUF 204 may have a plurality of queues (or slots) that may be referred to as receive queues. The receive queues temporarily store frames, until a request to move each frame is granted.

To move frames from the receive queues, a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for processing requests from various base ports. Scheduler 230 also maintains a data structure at a memory labeled as multicast group 230B. The data structure stores information for identifying multicast groups that may receive multicast frames, e.g., frames that are destined to multiple destinations. Scheduler 230 also stores configuration information 230C for various ports and some of that information may be used to select requests. Global scheduler 230 also includes a quality of service (QOS) module 230D for providing QOS for various sub-ports. Details regarding QOS module 230D are provided below.

Frames for transmission via TPORT 208 move via TBUF 206 and a modifier 238. In one embodiment, modifier 238 may be used to insert or remove information from an outgoing frame. The modification may be based on the frame type. The time-shared transmit pipeline 240 and MAC 242 are used to process outgoing frames. PCS 244, SERDES 246A-246D are used similarly to PCS 212 and SERDES 210A-210D. Network links 250A-250D are similar to links 247A-247D, except links 250A-250D are used to transmit frames. Furthermore, although separate MAC and PCS are shown for the transmit segment, the same PCS 212 and MAC 214 of the receive segment may be used in the transmit segment.

With further reference to FIG. 2B, each base port 128 includes a QOS bin module 260 and queues 249. The QOS bin module 260 may be used to implement QOS bins that are described below with reference to FIG. 4.

Figure 3A:
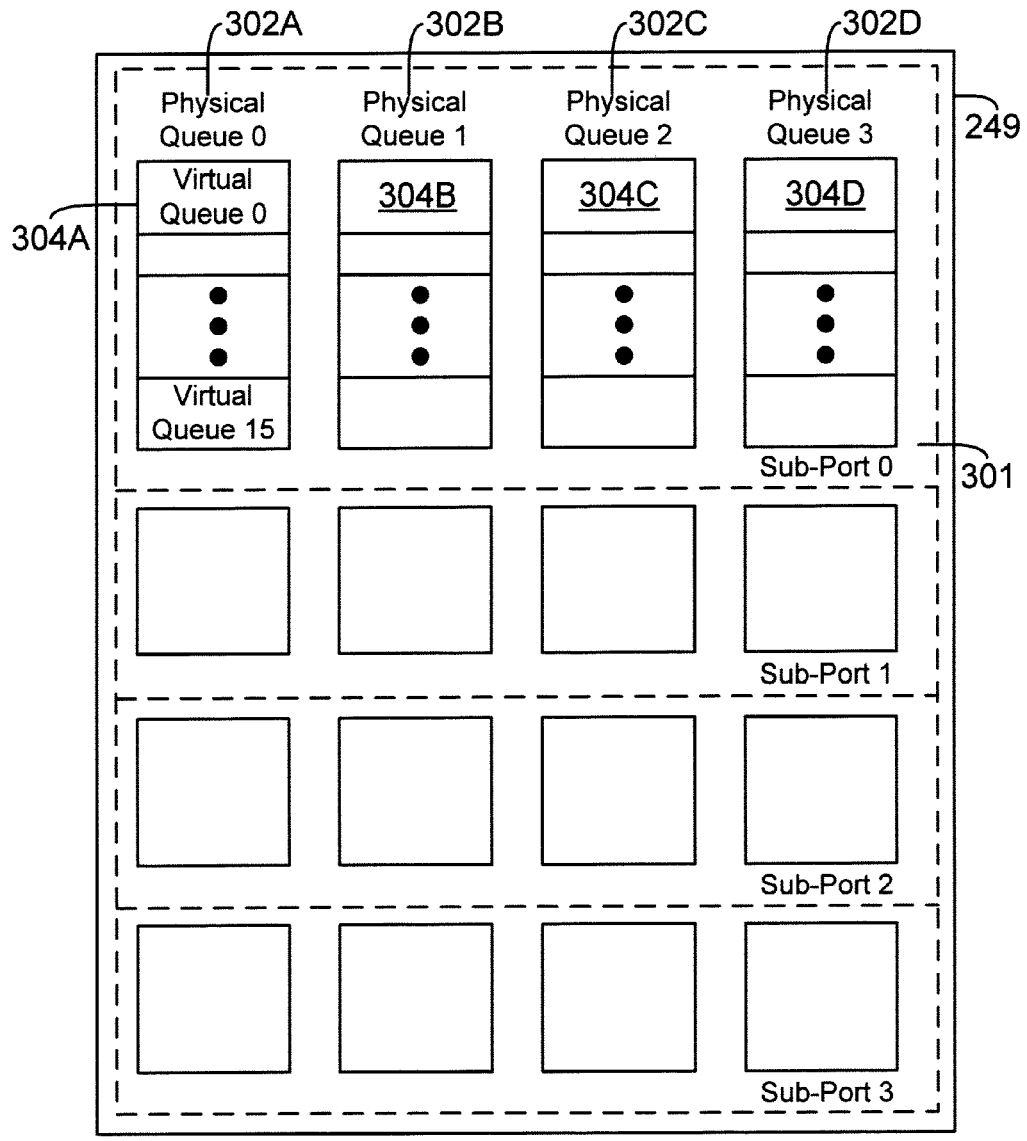
FIG. 3A is a functional block diagram of a queue block including a plurality of physical and virtual queues, according to the present embodiments.

An example of queues 249 is shown in FIG. 3A. Queues 249 may be subdivided into a plurality of queue sets 301 for each sub-port of base port 128. Each queue set 301 may include a plurality of physical queues, for example, four physical queues, shown as 302A-302D (may be referred to as physical queue or physical queues 302). Each physical queue 302 in turn includes a plurality of virtual queues (304A-304D), for example, sixteen virtual queues. For example, physical queue 302A includes virtual queues 304A, physical queue 302B includes virtual queues 304B and so forth. In one embodiment, there may be sixty-four virtual queues 304 for each sub-port.

In the illustrated embodiment, physical queues 302 illustrate a grouping of virtual queues 304 where they share the same link-level flow control. In other words, the link flow control is managed on a per physical queue basis. The virtual queues within a given physical queue are transmission gated by same flow control. The physical and virtual queues do not hold or process frame data. The queues in the illustrated embodiment are used to hold configuration information. This configuration information identifies a QOS bin and includes information for frame translation as shown in FIG. 3B.

Figure 3B:
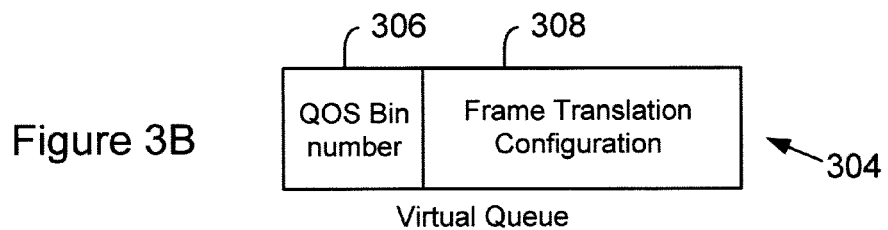
FIG. 3B is a functional block diagram of a virtual queue, according to the present embodiments.

With reference to FIG. 3B, a virtual queue 304 is used to store a plurality of fields for storing configuration information. The plurality of fields includes a QOS bin number 306 and frame translation configuration information 308. The use of the QOS bin number 306 is provided below in detail. The frame translation configuration information 308 is used to translate or modify an outgoing packet. The modification depends on the protocol of the received packet and the protocol of the packet that is transmitted. Details regarding frame modification/translation are provided in co-pending patent application, U.S. application Ser. No. 13/678,161, now U.S. Pat. No. 8,995,457, entitled, "Systems and Methods for Modifying Frames in a Network Device", the disclosure of which is incorporated herein, in its entirety.

The present embodiments provide QOS scheduling, which is a method of controlling an amount of bandwidth that is allowed from various source port(s) to a specific destination sub-port's virtual queue 304.

With further reference to FIGS. 2A/2B, the QOS module 230D communicates with a plurality of base ports 128 and then allocates bandwidth to specific destination sub-port virtual queues 300 on a percentage basis from among a plurality of groups of source traffic. These source traffic groups may be, for example, enhanced transmission selection (ETS) traffic classes and/or quantized congestion notification (QCN) flows. ETS provides the capability to group types of data flow, such as storage or networking, and assigns a group identification number to each of the groups, which may also be called traffic class groups. QCN is part of the IEEE Data Center Bridging (DCB) standard proposal aimed at enhancing existing IEEE 802.1 bridge specifications to satisfy the requirements for I/O consolidation. The goal of QCN is provide end-to-end congestion notification for Layer 2 networks. Switches that support QCN can notify end hosts (which must also support QCN) about the presence of congestion in the network. The end hosts can then respond by reducing their traffic transmission, helping alleviate the upstream congestion. This extension is defined in the IEEE 802.1Qau standard, which is incorporated by reference herein in its entirety.

To implement the above-described QOS scheduling, each TBUF 206 as shared by each sub-port includes a plurality of source traffic group structures called QOS bins 400 (FIG. 4) that are maintained by the QOS bin module 260. Each of the virtual queues 304 is mapped to one of the QOS bins 400 using the QOS bin number 306 stored at each virtual queue 304. The virtual queues 304 mapped to a given QOS bin 400 comprise that QOS bin's source traffic group. Each QOS bin 400 monitors the bandwidth consumed by its source traffic group and adjusts the scheduler QOS priority for the virtual queues 304 that are part of its source traffic group as the relationship between the bandwidth consumed versus the bandwidth allocated changes, as further described below. The mapping of virtual queues 304 to QOS bins 400 may remain constant, or change according to various circumstances. These circumstances may include change requests that are received for QCN flows or ETS flow. They may also include user input to redistribute the links bandwidth among the different data flows using the transmit link.

Figure 4:
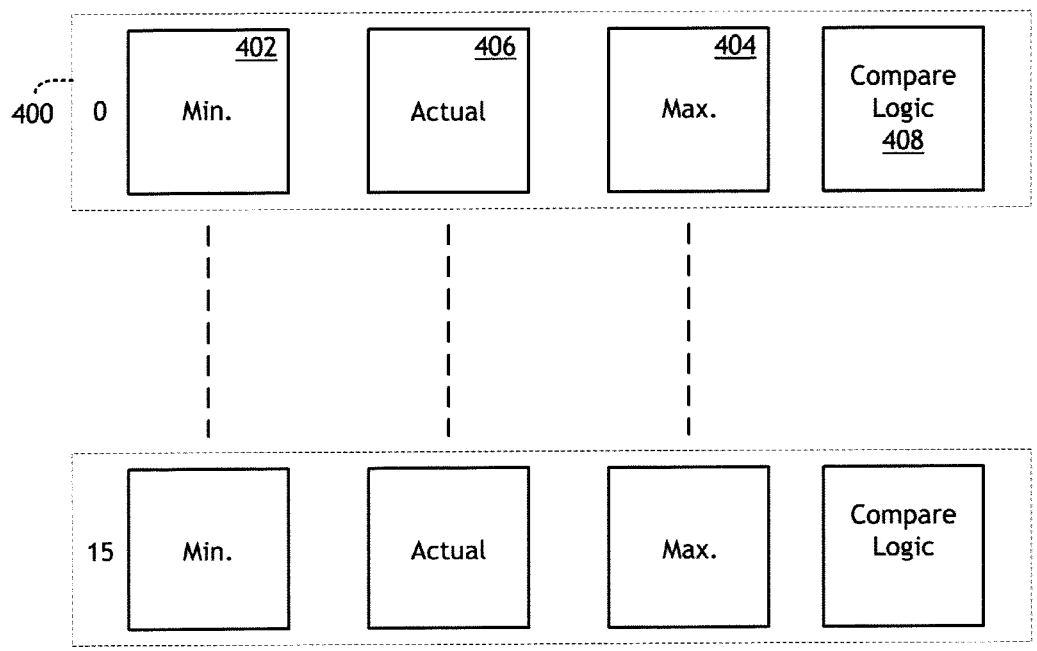
FIG. 4 is a functional block diagram of quality of service bins, according to the present embodiments.

FIG. 4 illustrates one example of QOS bins 400. The illustrated embodiment includes sixteen QOS bins 400, but in other embodiments any number of QOS bins 400 may be provided. Each QOS bin 400 comprises a minimum bandwidth limit threshold value 402, a maximum bandwidth limit threshold value 404, an actual bandwidth consumed counter 406, and comparison logic 408 that calculates QOS priority. The values of the minimum and maximum bandwidth limit threshold values 402, 404 may be programmable and set by firmware, for example, while the value of the actual bandwidth consumed counter 406 monitors bandwidth as bandwidth is consumed. However, the value of the actual bandwidth consumed counter 406 may be reset in response to certain events that are described below.

The comparison logic 408 of the QOS bins 400 calculates QOS priority dynamically, meaning that as packets for a QOS bin 400 are transmitted, the QOS bin's priority may change. When a QOS bin's priority changes, the priority of all of the virtual queues 304 associated with that QOS bin 400 are also changed.

Table I below provides one example for dynamically adjusting the priorities of the QOS bins 400:

TABLE I

| QOS Priority | QOS Priority Definition | Comment |
|---|---|---|
| 7 | $X < \frac{1}{4}$ Min | Highest Priority |
| 6 | $\frac{1}{4}$ Min $\leq X < \frac{1}{2}$ Min | |
| 5 | $\frac{1}{2}$ Min $\leq X < \frac{3}{4}$ Min | |
| 4 | $\frac{3}{4}$ Min $\leq X <$ Min | |
| 3 | Min $\leq X < \frac{1}{2}$ Max | |
| 2 | $\frac{1}{2}$ Max $\leq X < \frac{3}{4}$ Max | |
| 1 | $\frac{3}{4}$ Max $\leq X <$ Max | |
| 0 | $X \geq$ Max | Lowest Priority |

TABLE I-continued

Where: Min=Minimum bandwidth threshold value 402; Max=Maximum bandwidth threshold value 404; and X=Actual bandwidth consumed counter 406 value.

Thus, when a QOS bin 400 transmits packets, its QOS priority is reduced. For example, with reference to the first line of Table I above, if a given QOS bin 400 has transmitted less than one-quarter of the value of its minimum bandwidth limit threshold value 402, it will have a QOS priority of 7, which is the highest priority. As the QOS bin 400 transmits more packets, the value of its actual bandwidth consumed counter 406 increases. If the value of its actual bandwidth consumed counter 406 becomes greater than or equal to one-quarter of the value of its minimum bandwidth limit threshold value 402, but less than one-half of the value of its minimum bandwidth limit threshold value 402, its QOS priority will become 6, which is the second highest priority (second line of Table I above). Eventually, the value of its actual bandwidth consumed counter 406 may become greater than or equal to the value of its maximum bandwidth limit threshold value 404, at which point its QOS priority will become 0, which is the lowest priority (last line of Table I above). In one embodiment, a virtual queue may be configured such that when a QOS bin 400's priority is 0, it may be prevented from transmitting further packets until its actual bandwidth consumed counter 406 is reset, as detailed below.

Figure 5:
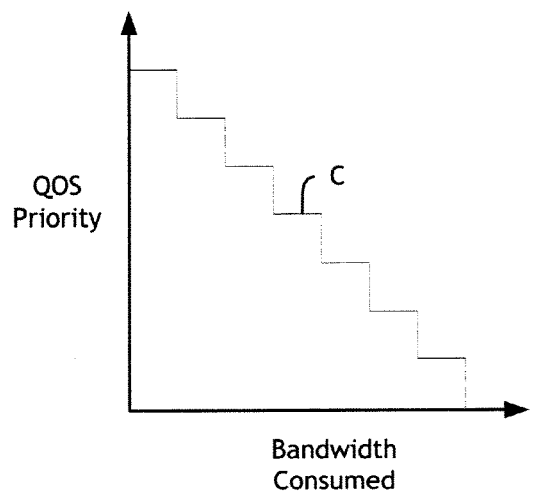
FIG. 5 is a graph plotting bandwidth consumed versus quality of service priority, according to the present embodiments.

FIG. 5 illustrates graphically the relationship between QOS priority and bandwidth consumed according to the present embodiments. QOS priority is high when little to no bandwidth has been consumed, but reduces as more and more bandwidth is consumed. In the present embodiments, priority is decremented in a quantized fashion, as shown in Table I above, which shows eight distinct priority levels (QOS Priority 0-7). Hence, the curve C in FIG. 5 is stepped. As the number of distinct priority levels provided increases, the curve C becomes smoother. With enough distinct priority levels, the curve C approaches a smooth curve, which represents the ideal QOS priority scheme.

The values of the actual bandwidth consumed counter 406 for all QOS bins 400 are reset in response to certain events. For example, a scrub (reset) operation may be performed whenever a dirty indicator in any of the QOS bins 400 is set. The dirty indicator gets set when the actual bandwidth consumed counter 406 for a given QOS bin 400 becomes greater than or equal to the value of the maximum bandwidth limit threshold value 404 for that QOS bin 400. It remains set until it is cleared by a scrub operation. In another example, a scrub operation may be performed when a scrub interval timeout event occurs. In another example, firmware may force a scrub operation. When a scrub operation is performed, the actual bandwidth consumed counters 406 for all QOS bins 400 may be reset (zeroed out), or divided by a divisor, such as 2. In one embodiment, the QOS bins 400 may get loaded with a value equal to the amount that the actual bandwidth consumed counter 406 exceeded the value of the maximum bandwidth limit threshold. In another embodiment, the QOS bins 400 may get loaded with a value equal to the amount that the actual bandwidth consumed counter 406 had remaining until it was equal to the value of the maximum bandwidth limit threshold. The value loaded in the actual bandwidth consumed counter 406 would be the difference between the maximum bandwidth limit threshold 404 and the previous value of the actual bandwidth consumed counter 406 before the scrub. In this case it would be a value less than or equal to zero.

Figure 6:
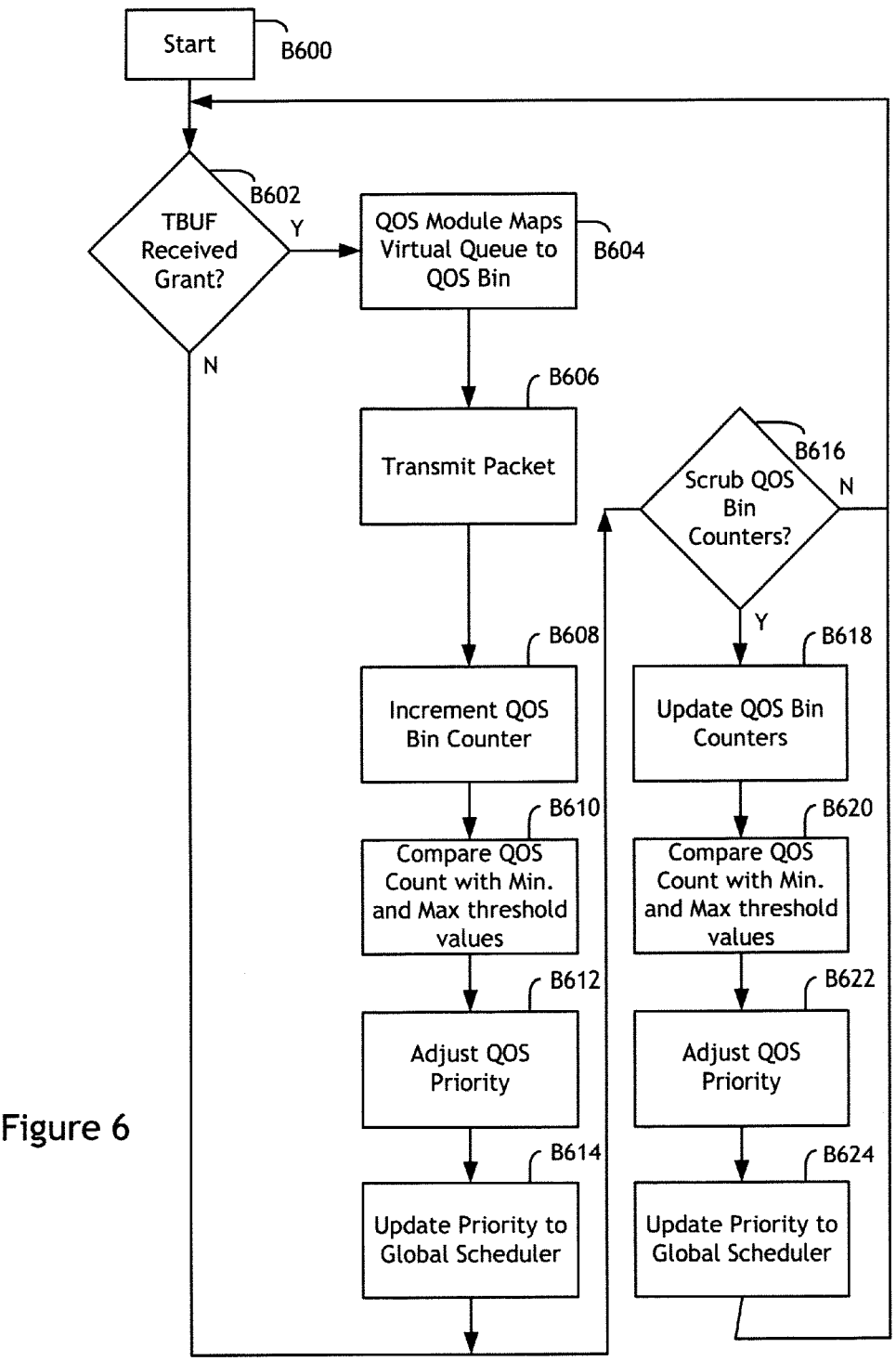
FIG. 6 is a flowchart illustrating one embodiment of the present methods for providing quality of service in networks.

FIG. 6 is a flowchart illustrating one embodiment of the present methods for quality of service in networks. The process begins at block B600. At block B602, the process determines whether the TBUF 206 has received a grant from the scheduler 230 to transmit a packet. If it has, then the process advances to block B604, where the QOS module 230D maps the virtual queue 304 associated with the grant to one of the QOS bins 400. The process advances to block B606, where the packet is transmitted.

The process advances to block B608 where the actual bandwidth consumed counter 406 associated with that bin is incremented. The actual bandwidth consumed counter is incremented based on the size of the packet and the link rate of the transmit link. After the actual bandwidth consumed counter 406 is incremented, the process advances to block B610, where the actual bandwidth consumed counter 406 is compared to the minimum and maximum bandwidth limit thresholds, 402, 404 associated with the bin 400. The priority for the bin is then adjusted, at block B612, based on the comparison. The priority adjustment may be based on Table I, described above. The process then advances to block B614, where the adjusted priority is sent to the scheduler 230 so that the scheduler 230 can make further QOS priority determinations based on the updated information.

Then the process advances to block B616. At block B616, it is determined whether the actual bandwidth consumed counters 406 are to be scrubbed. If not, the process loops back to block B602 to determine if TBUF has received another grant. However, if the QOS bin counters 406 are to be scrubbed, then the process advances to block B618, where the QOS bin counters 406 are updated. As discussed above, the update may comprise zeroing out the counters 406, or dividing each by a divisor. The process then advances through blocks B620, B622, and B624, which are similar to blocks B610, B612, and B614, which are discussed above. After block B624, the process loops back to block B602 to determine if TBUF has received another grant.

Figure 7:
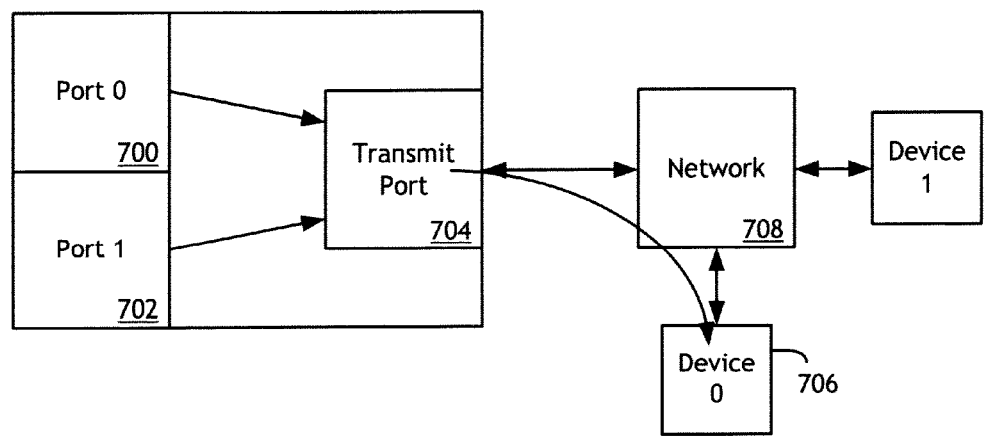
FIG. 7 is a functional block diagram of a network, illustrating two ports sending packets to a common destination, according to the present embodiments.

One advantage of the present embodiments, including mapping virtual queues 304 to QOS bins 400, is the enablement of tracking of QOS for multiple ports without the need to have a separate set of counters for every port. This aspect reduces complexity, and is particularly advantageous for tracking QOS for ports of different protocols. For example, with reference to FIG. 7, a first port 700 (Port 0) is a Fibre Channel port, and a second port 702 (Port 1) is an Ethernet port. Each port 700, 702 sends packets through a transmit port 704 destined for a network device 706 (Device 0) via Network 708. As packets from each port 700, 702 pass through the TBUF 206 of the transmit port 704, they are received using different virtual queues 304 (a first virtual queue 304 and a second virtual queue 304) due to the fact that they are of different protocols, and, therefore, require different processing prior to being transmitted. By mapping the first and second virtual queues 304 to the same QOS bin 400, the QOS for both the first and second ports 700, 702 can be tracked using a single counter, despite the fact that the first and second ports 700, 702 are of different protocols.

Another advantage of the present embodiments is that QOS priority is continuously and dynamically adjusted across a broad continuum as bandwidth is consumed. With reference to Table I above, the QOS priority for a given QOS bin 400 decreases incrementally as that bin 400 consumes more and more bandwidth. Eight priority levels are shown, but in other embodiments any number of priority levels could be provided. Providing QOS priority across a broad continuum is advantageous compared to a standard high/low priority delineation, because it provides more separation between data flows. It is also a smoother distribution of the link's bandwidth. With a more limited number of priorities, a given data flow may have maximum bandwidth for a first half of a period and no bandwidth for the second half of the period. With more levels of priority, the amount of bandwidth that a given data flow achieves can be spread over the entire period, as shown in FIG. 5.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the embodiments disclosed herein may be implemented in adapters, network interface cards, routers and other similar devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for providing quality of service (QOS) in a network, the method comprising:
   determining whether a transmit segment of a port of a network device has received a grant from a scheduler to transmit a packet; wherein the port includes a plurality of sub-ports that share the transmit segment to transmit packets and share a receive segment to receive packets;
   when the transmit segment has received the grant, mapping a virtual queue associated with the grant to a QOS bin that includes a minimum bandwidth threshold value, a maximum bandwidth threshold value, and a counter for counting actual bandwidth consumed among a subset of the plurality of sub-ports associated with the QOS bin wherein the subset of the plurality of sub-ports operate according to different protocols; wherein the QOS bin monitors bandwidth consumed by a source traffic group for adjusting QOS priority and the source traffic group includes the virtual queue;
   comparing a counter value with the minimum bandwidth threshold value and the maximum bandwidth threshold value after the packet is transmitted;
   adjusting a QOS priority for the QOS bin, based on the comparison, when the counter value has reached the maximum bandwidth threshold value or the minimum bandwidth threshold value; and
   sending an adjusted QOS priority to the scheduler when the QOS priority is adjusted such that the scheduler can use the adjusted priority when evaluating requests from the plurality of sub-ports for processing received packets.

2. The method of claim 1, wherein the counter is incremented after the packet is transmitted, based on a size of the packet and a link rate of a transmit link.

3. The method of claim 1, wherein the QOS priority is at a maximum when the counter value is less than one-quarter of the minimum bandwidth threshold value.

4. The method of claim 1, wherein the QOS priority is at a minimum when the counter value is greater than or equal to the maximum bandwidth threshold value.

5. The method of claim 1, wherein the network device is a switch coupled to one or more devices.

6. The method of claim 1, wherein one of the plurality of sub-ports is configured to operate as a Fibre Channel port.

7. The method of claim 1, wherein one of the plurality of sub-ports is configured to operate as an Ethernet port.

8. A network device, comprising:
 a plurality of base-ports, each base-port having a plurality of sub-ports configured to operate independently as a port for sending and receiving packets using a shared transmit segment to transmit packets and a shared receive segment to receive packets;
 a scheduler that evaluates requests from the plurality of sub-ports for processing packets received at the plurality of sub-ports of each base-port;
 a QOS bin module that maintains a plurality of QOS bins for monitoring bandwidth consumed by a source traffic group, each QOS bin including a minimum bandwidth threshold value, a maximum bandwidth threshold value, and a counter for counting actual bandwidth consumed by the source traffic group wherein the source traffic group includes a subset of the plurality of sub-ports and wherein the source traffic group sub-ports operate according to different protocols; and
 wherein when the transmit segment receives a grant from the scheduler to transmit a packet, a virtual queue associated with the grant is mapped to one of the QOS bins and a value of the counter is incremented after the packet is transmitted and the counter value is compared with the minimum bandwidth threshold value and the maximum bandwidth threshold value; and
 wherein a QOS priority for the bin is adjusted when, based on the comparison, the counter value has reached either the maximum bandwidth threshold value or the minimum bandwidth threshold value, and an adjusted QOS priority is sent to the scheduler when the QOS priority is adjusted such that the scheduler can use the adjusted priority when evaluating requests from the plurality of sub-ports for processing received packets.

9. The network device of claim 8, wherein the scheduler includes arbitration logic that performs dual stage arbitration for requests from the plurality of sub-ports of the network device.

10. The network device of claim 8, wherein the counter is incremented based on a size of the packet and a link rate of a transmit link.

11. The network device of claim 8, wherein the QOS priority is at a maximum if the counter value is less than one-quarter of the minimum bandwidth threshold value.

12. The network device of claim 8, wherein the QOS priority is at a minimum if the counter value is greater than or equal to the maximum threshold value.

13. The network device of claim 8, wherein the network device is a switch coupled to one or more devices.

14. The network device of claim 8, wherein one of the plurality of sub-ports is configured to operate as a Fibre Channel port.

15. The network of claim 8, wherein one of the plurality of sub-ports is configured to operate as an Ethernet port.

16. A machine-implemented method for a network, the method comprising:
 determining whether a transmit segment of a port of a network device has received a grant from a scheduler to transmit a packet; wherein the port includes a plurality of sub-ports that share the transmit segment to transmit packets and a receive segment to receive packets;
 when the transmit segment has received the grant, mapping a virtual queue associated with the grant to a QOS bin that includes a minimum bandwidth threshold value, a maximum bandwidth threshold value, and a counter for counting actual bandwidth consumed; wherein the QOS bin monitors bandwidth consumed by a source traffic group for adjusting QOS priority and the source traffic group includes the virtual queue and wherein the source traffic group includes a subset of the plurality of sub-ports and wherein the source traffic group sub-ports operate according to different protocols;
 comparing a counter value with the minimum bandwidth threshold value and the maximum bandwidth threshold value after the packet is transmitted; and
 adjusting a QOS priority for the QOS bin, based on the comparison, when the counter value has reached the maximum bandwidth threshold value or the minimum bandwidth threshold value.

17. The method of claim 16, wherein the QOS priority is at a maximum when the counter value is less than one-quarter of the minimum bandwidth threshold value.

18. The method of claim 16, wherein the QOS priority is at a minimum when the counter value is greater than or equal to the maximum bandwidth threshold value.

19. The method of claim 16, wherein one of the plurality of sub-ports is configured to operate as a Fibre Channel port.

20. The method of claim 16, wherein one of the plurality of sub-ports is configured to operate as an Ethernet port.

* * * * *